United States Patent
Toda

(10) Patent No.: US 6,636,236 B1
(45) Date of Patent: Oct. 21, 2003

(54) INFORMATION PRESENTATION METHOD AND INFORMATION RECORDING MEDIUM AND PRESENTATION DEVICE FOR IMPLEMENTING THE METHOD

(75) Inventor: Manabu Toda, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/309,589

(22) Filed: May 11, 1999

(30) Foreign Application Priority Data

Aug. 24, 1998 (JP) .......................................... 10-237607

(51) Int. Cl.⁷ ................................................ G09G 5/00
(52) U.S. Cl. ...................................... 345/707; 345/744
(58) Field of Search ................................ 345/705, 707, 345/708, 709, 744, 745

(56) References Cited

U.S. PATENT DOCUMENTS

| | | | | |
|---|---|---|---|---|
| 4,679,789 A | * | 7/1987 | Okada .......................... | 463/23 |
| 4,964,077 A | * | 10/1990 | Eisen et al. .................. | 345/707 |
| 5,042,006 A | * | 8/1991 | Flohrer ........................ | 379/360 |
| 5,377,319 A | * | 12/1994 | Kitahara et al. ............. | 345/473 |
| 5,396,264 A | | 3/1995 | Falcone et al. ............. | 345/511 |
| 5,774,118 A | * | 6/1998 | Hatakama ................... | 345/707 |
| 6,061,576 A | * | 5/2000 | Terrasson ................... | 455/566 |
| 6,134,018 A | * | 10/2000 | Dziesietnik et al. ....... | 358/1.15 |
| 6,219,695 B1 | * | 4/2001 | Guttag et al. ................ | 345/2.1 |

FOREIGN PATENT DOCUMENTS

| | | |
|---|---|---|
| EP | 0 477 854 | 4/1992 |
| EP | 0 844 553 | 5/1998 |
| GB | 2 317 246 | 3/1998 |
| JP | 2-58124 | 2/1990 |

* cited by examiner

Primary Examiner—Kristine Kincaid
Assistant Examiner—Thanh Vu
(74) Attorney, Agent, or Firm—Nixon & Vanderhye P.C.

(57) ABSTRACT

A primary object of the present invention is to provide an information presentation device capable of presenting operation support information such as operation process and an input operation procedure to help a user in doing input operation with an electronic apparatus and simplifying the presentation according to a degree of the user's acquaintance with the operation of the apparatus, whereby enabling the user to more effectively use the apparatus with no unnecessary waiting time and with an increased efficiency of using the capacity of the memory device. A presentation control unit processes the presentation data for supporting the user's inputting operation. To simplify the presentation information that may become unnecessary for a user who becomes aquatinted with the operation with the apparatus, a CPU is provided with data collecting means for collecting data for estimating a degree of necessity of the operation support information and discriminating means for discriminating necessity of the presentation. The estimate data includes user's operation records such as the number of operation starts, the number of data presentations, an input-key operation speed and used capacity of a memory device. The discriminating means decides a degree of necessity of presenting the information and a degree of simplifying the presentation information according to the data obtained by the data collecting means. The presentation is simplified by thinning out the presentation images and/or shortening a presentation time.

18 Claims, 8 Drawing Sheets

FIG.4
| VISUAL INFORMATION WHEN MAILING A LETTER | 412, 413, 414, 415, | Tx=0.2 |
|---|---|---|
| VISUAL INFORMATION WHEN CHECKING RECEIPT OF A LETTER | 416, 417, 418, 419, | Tx=0.2 |
411
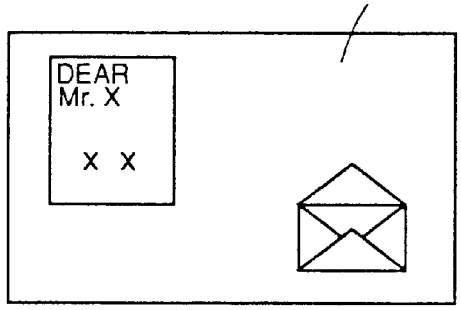
412
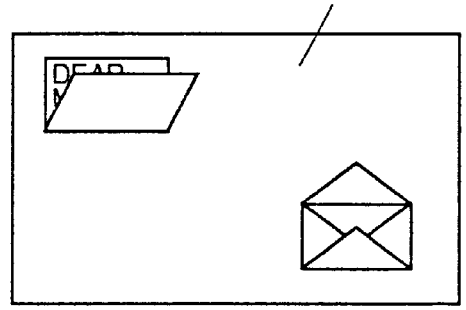
413
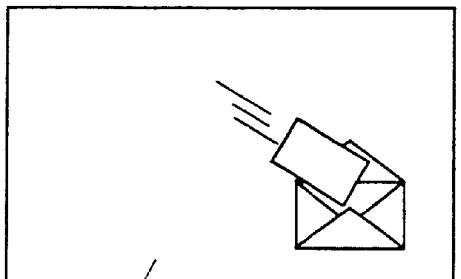
414
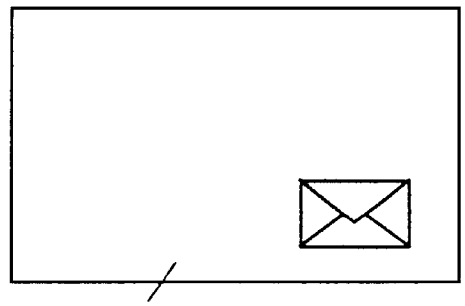
415

| VISUAL INFORMATION WHEN MAILING A LETTER | 412, 415, | Tx=0.2 |
|---|---|---|
| VISUAL INFORMATION WHEN CHECKING RECEIPT OF A LETTER | 416, 417, 418, 419, | Tx=0.2 |

| VISUAL INFORMATION WHEN MAILING A LETTER | 415, | Tx=0.2 |
|---|---|---|
| VISUAL INFORMATION WHEN CHECKING RECEIPT OF A LETTER | 416, 417, 418, 419, | Tx=0.1 |

| VISUAL INFORMATION WHEN MAILING A LETTER | (NIL) | Tx=0.2 |
|---|---|---|
| VISUAL INFORMATION WHEN CHECKING RECEIPT OF A LETTER | 416, 417, 418, 419, | Tx=0.2 |

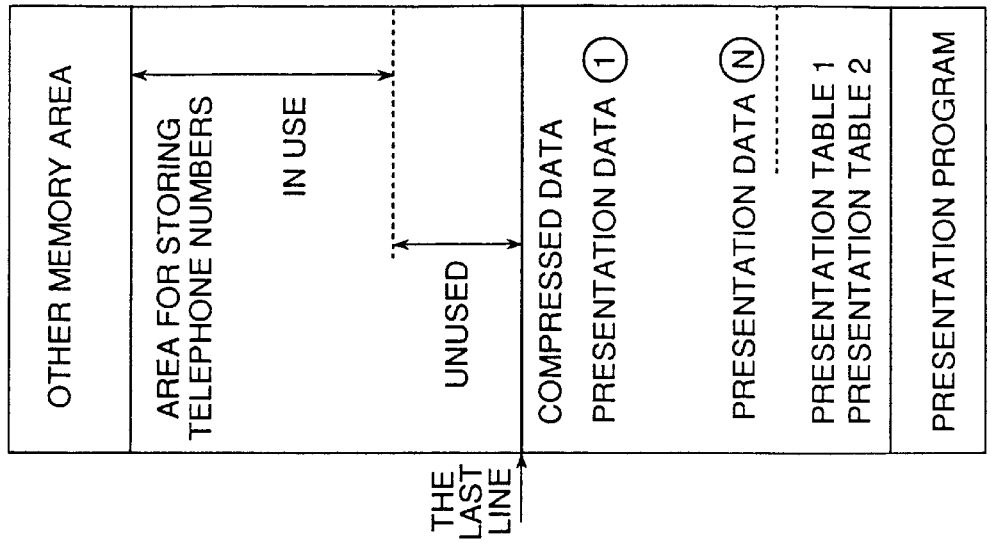
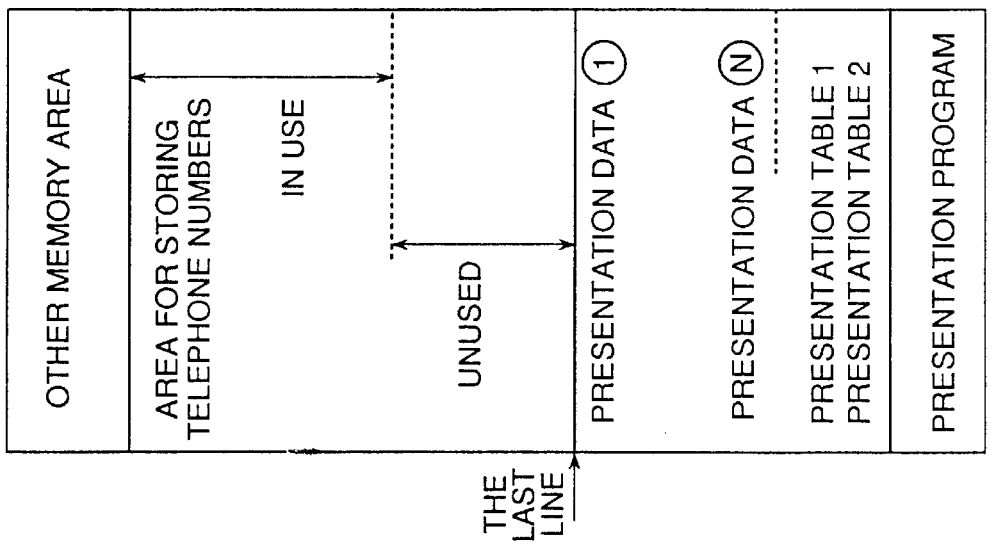
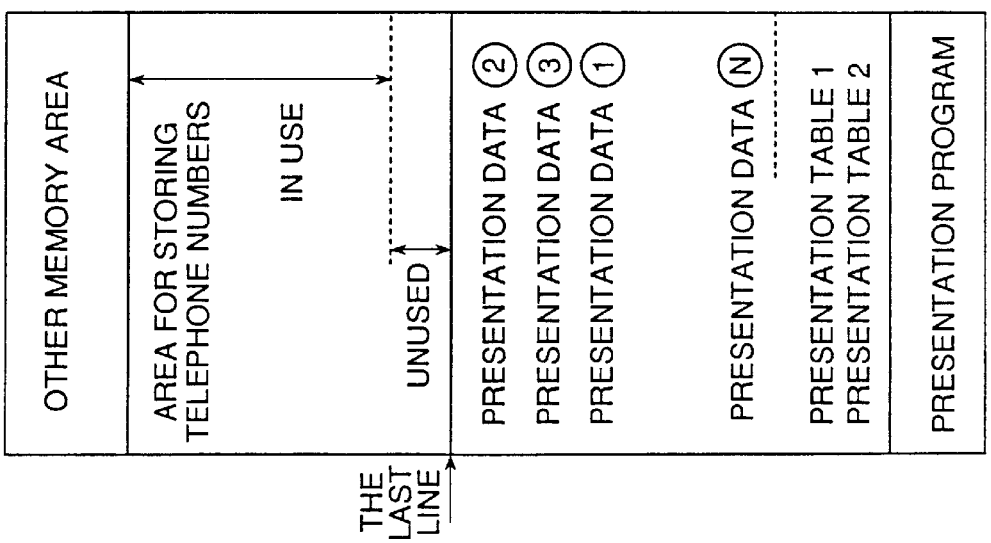

INFORMATION PRESENTATION METHOD AND INFORMATION RECORDING MEDIUM AND PRESENTATION DEVICE FOR IMPLEMENTING THE METHOD

BACKGROUND OF THE INVENTION

The present invention relates to information presentation method and more particularly to an information presenting means used in an electronic apparatus such as a telephone with a display, which can serve for interface with a user who is inputting data to the electronic apparatus.

Typically, a portable telephone having a display function and a mailing function has been used, which enables a user to send a letter to another telephone terminal, being visually informed of the mailing state or mailing procedure by animation on a display screen. This is achieved for example by sequentially presenting animated image data ①, ②, ③ and ④ as shown in FIG. 2. Another type presentation for the user is made by sequentially presenting audio information or outputting music or text information.

In many cases, the user may take pleasure in operation with the presentation of working information (visual or audible information) on the telephone for an initial period of use but he or she may lose interest in the same repeated presentation. In such a mood, the display may irritate the user since he or she is not allowed to do the next inputting operation. Even the telephone can allow the user to do inputting operation while the display works, he or she may not be informed of the possibility of doing inputting operation and may lose a time until the display ends.

Furthermore, the telephone contains software and data necessary for carrying out the presentation, which, however, may be unnecessary for the user who is skilled in operation of the telephone apparatus and may think it is a loss of a memory. The data that became unnecessary for the skilled user cannot be erased if the data are stored in a read-only memory of the apparatus. The memory area occupied with the data cannot be reused.

On the other hands, the amount of data registered by the user is increased as the user uses the telephone apparatus. Accordingly, the skilled user may experience an overflow of the user's memory area and keenly desires effective use of the memory capacity of the apparatus.

SUMMARY OF THE INVENTION

The object of the present invention is to provide a presentation device with a presentation means for presenting a working state or an operating procedure of the apparatus, which is capable of changing the presentation information to help a user in operating the electronic apparatus according to the skill of the user of the apparatus so that the user may do inputting operation without unnecessary waiting time and more effectively use the capacity of the presentation data storing memory to store other kinds of desired data if necessary.

Another object of the present invention is to provide an information presentation method, memory medium or presentation device that is designed according to the following technical concept:

The presentation is shortened or omitted according to the user's skill, presumed from an input operation rate (the number of operations and duration).

The presentation is shortened or omitted according to its necessity for the user, which is presumed by the fact that he or she could start inputting operation before the end of presentation.

The presentation is shortened or omitted according to its necessity for the user, which is presumed by usage of the memory capacity or remaining capacity of the memory.

Furthermore, the presentation data and software are stored in an erasable memory so that the user may erase data that became not to be displayed or store the data in the compressed state to increase the memory area usable for storing the other kinds of data.

Another object of the present invention is to provide an information presentation method for presenting information such as an operating process or an inputting procedure of an electronic apparatus provided with a presenting means, which is capable of estimating the necessity of presenting the information according to operation records or state information of the electronic apparatus and simplifying the presentation information according to the estimation result.

Another object of the present invention is to provide an information presentation method, which is characterized in that the presentation information is simplified by deleting at least a part of the information or by using another type of information having a smaller amount of data.

Another object of the present invention is to provide an information presentation method, which is characterized in that the information is presented as animated images and simplified by reducing the number of the images or shortening duration of presenting each of the images.

Another object of the present invention is to provide an information presentation method, which is characterized in that the presentation information is an audio information and simplified by deleting at least a part of audio information or by shortening duration of the audio information.

Another object of the present invention is to provide an information recording medium (memory device) for recording information such as a presentation program and data necessary for implementing the method defined.

Another object of the present invention is to provide an information presentation device for presenting an operating process or an inputting operation procedure of an electronic apparatus provided with a presentation means, which is provided with a data collecting means for collecting operation records of the electronic apparatus or working information including a current working state of the device to estimate a degree of necessity of presenting the information and a discriminating means for determining a degree of necessity of presenting the information according to the data collected by the data collecting means and judging the necessity of changing the presentation information based on the determined necessity degree of the presentation, and which simplifies the presentation information according to the judgment made by the discriminating means.

Another object of the present invention is to provide an information presentation device, which is characterized in that data collectable by the data collecting means is data representing operation records of the electronic apparatus, which data includes at least one of the following parameters: the number of the apparatus operation starts, the number of the apparatus operation ends, the number of the presentation program starts, the number of the presentation program ends, the number of data presentations, an integrated operation time of the apparatus and a change in user's input operation speed.

Another object of the present invention is to provide an information presentation device, which is further characterized in that the data collectable by the data collecting means is the number of input operations made by a user during presentation of the specified information.

Another object of the present invention is to provide an information presentation device, which is characterized in that data collectable by the data collecting means is data representing used capacity and/or unused capacity of a memory of the electronic apparatus.

Another object of the present invention is to provide an information presentation device, which is characterized in that the device is further provided with a data erasing means for erasing data stored in the memory of the electronic apparatus and, when the discriminating means judges there is no need to present the information, causes the data erasing means to delete the unnecessary presentation data and/or the unnecessary program from the memory.

Another object of the present invention is to provide an information presentation device, which is characterized in that the device is further provided with a data compressing means for compressing data stored in the memory of the electronic apparatus and, when the discriminating means discriminates it is unnecessary to present the information, causes the data compressing means to compress the unnecessary presentation data and/or the unnecessary program in the memory.

Another object of the present invention is to provide an information presentation device, which is characterized in that the device is further provided with a data restoring means for restoring compressed data in the memory of the electronic apparatus and a data changing means for changing an estimate value of data obtained by the data collecting means and causes the data restoring means to restore the compressed data and/or the program to the expanded state and stored in the memory and the data changing means to change the values of the estimate data obtained by the data collecting means.

Another object of the present invention is to provide an information presentation device, which is characterized in that the device is further provided with a nullifying means for nullifying the discrimination made by the discriminating means to preventing the presentation from being simplified.

Another object of the present invention is to provide an information presentation device, which is characterized in that the presentation information is changed depending upon a result of discrimination made by the discriminating means in such a way that the presentation information is simplified in a plurality of stages corresponding to unnecessary degrees of the presentation.

Another object of the present invention is to provide an information presentation device, which is characterized in that simplification of the presentation in a plurality of stages is conducted by thinning out the presentation data and/or shortening a presentation time.

Another object of the present invention is to provide an information presentation device, which is characterized in that data is arranged in the memory of the electronic apparatus in such a way that erasable or compressible data of the presentation data and/or the presentation program is disposed next to an area of data to be updated any time at need.

BRIEF DESCRIPTION OF THE DRAWINGS

FIG. 4 shows an exemplified presentation data table and images corresponding to the presentation data.

FIGS. 11A, 11B, 11C show usage states of a memory, which areas are changed depending upon the simplification of the operation support presentation.

PREFERRED EMBODIMENTS OF THE INVENTION

An embodiment of the present invention will be described below with reference to accompanying drawings.

Figure 1:
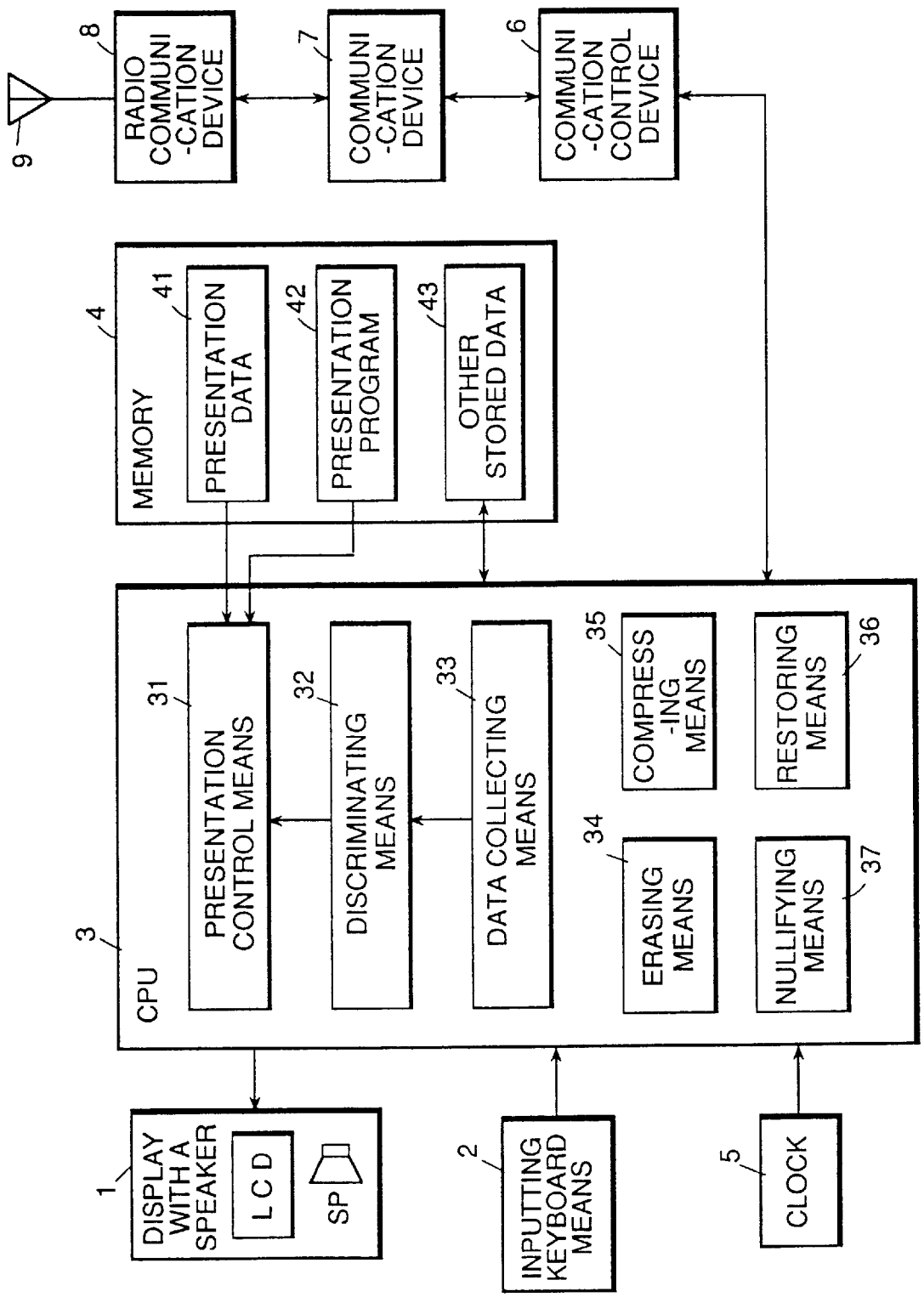
FIG. 1 is a block diagram of a whole system of a portable telephone which is an embodiment of the present invention.
Figure 2:
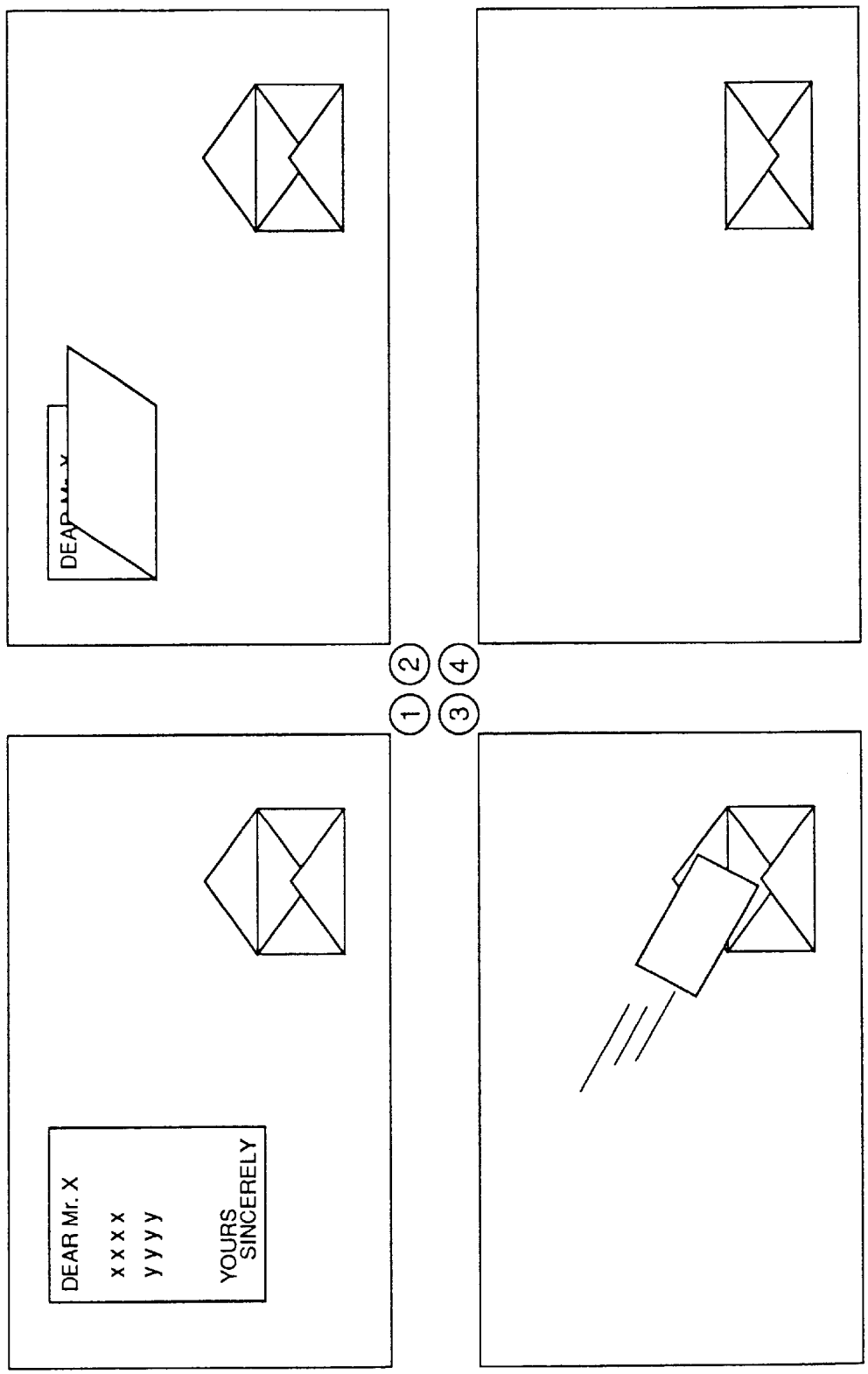
FIG. 2 shows an exemplified presentation of operation support information to support a user in doing inputting operation in the embodiment of present invention.

FIG. 1 is a block diagram showing a whole system of a portable telephone provided with an operation support display according to an aspect of the present invention. The construction of the shown portable telephone and its operation will be described as follows:

When a user inputted a mailing command through an inputting keyboard means (keyboard). 2, a central processing unit (CPU) 3 in the portable telephone terminal reads a presentation program 42 and presentation data 41 from a memory 4 and causes the presentation control means 31 to process the presentation data for supporting the user in doing a mailing procedure and present the information as, e.g., animation on a display 1 as shown in FIG. 2 (to be described in detail later).

In parallel with this, CPU 3 sends a prepared mail data to a communication control device 6 that in turn transmits the mail data through a communication device 7, a radio transmitter 8 and antenna 9 to a base station (not shown) through which the mail data is delivered to a designated receiving terminal.

In process of operating the portable telephone, the user may register telephone numbers and persons' names in a telephone number table to facilitate use of the terminal. In this case, the CPU 3 causes the telephone number storing means (not shown) to store the information input through the keyboard 2 in a specified area of the memory 4, which area is allocated to storage of other stored data 43 other than the presentation program and presentation data. The operation records of the potable telephone for a period from the beginning of the use to the present moment (including the current operating state) are also stored in a specified area for the other stored data 43.

The operation records also include used (or unused) capacity of the memory 4, the number of operation starts of the telephone, the number of operation ends of the telephone, the number of operation starts of the program, the number of operation ends of the program, the number of presentations and an integrated operation time of the telephone.

The presentation control means 31 presents mailing operation support information that may become unnecessary as the user becomes skilled in the mailing operation. Accordingly, the present invention provides the CPU 3 with data collecting means 33 for collecting data for estimating the necessity of presenting the operation support information and discriminating means 32 for judging whether the operation support information is needed.

The data collecting means 33 collects information included in the operation records of the device, which information consists of:

(A) the number of operation starts of the electronic apparatus, which is a total count of power switching-on operations of the apparatus;

(B) the number of operation ends of the apparatus, which is a total count of power switching-off operations of the apparatus;

(C) the number of program starts, which is a total count of execution starts of the presentation program 42;

(D) the number of program ends, which is a total count of execution ends of the presentation program 42;

(E) the number of presentations, which is a total count of presentations of presentation data 41;

(F) time (speed) of input operation by the user, recorded from the initial period of using the apparatus;

(G) time spend from the initial period of using the apparatus by the user;

(H) the number of input operations made by the user while the presentation data 41 is displayed;

(I) used capacity of the device memory;

(J) unused capacity of the apparatus memory and a change in user's input operation speed, which is calculated from the data (A)–(J).

The data is used for estimating the necessity of presenting the operation support information. The time data is measured by a clock 5.

The discriminating means 32 makes a judgment on the necessity of presenting the operation support information and decides the degree of simplification of the presentation according to the data collected by the data collecting means 33. The judgment is made by using a discrimination method and a threshold value set and stored in the specified memory area for the other stored data 43.

Figure 3:
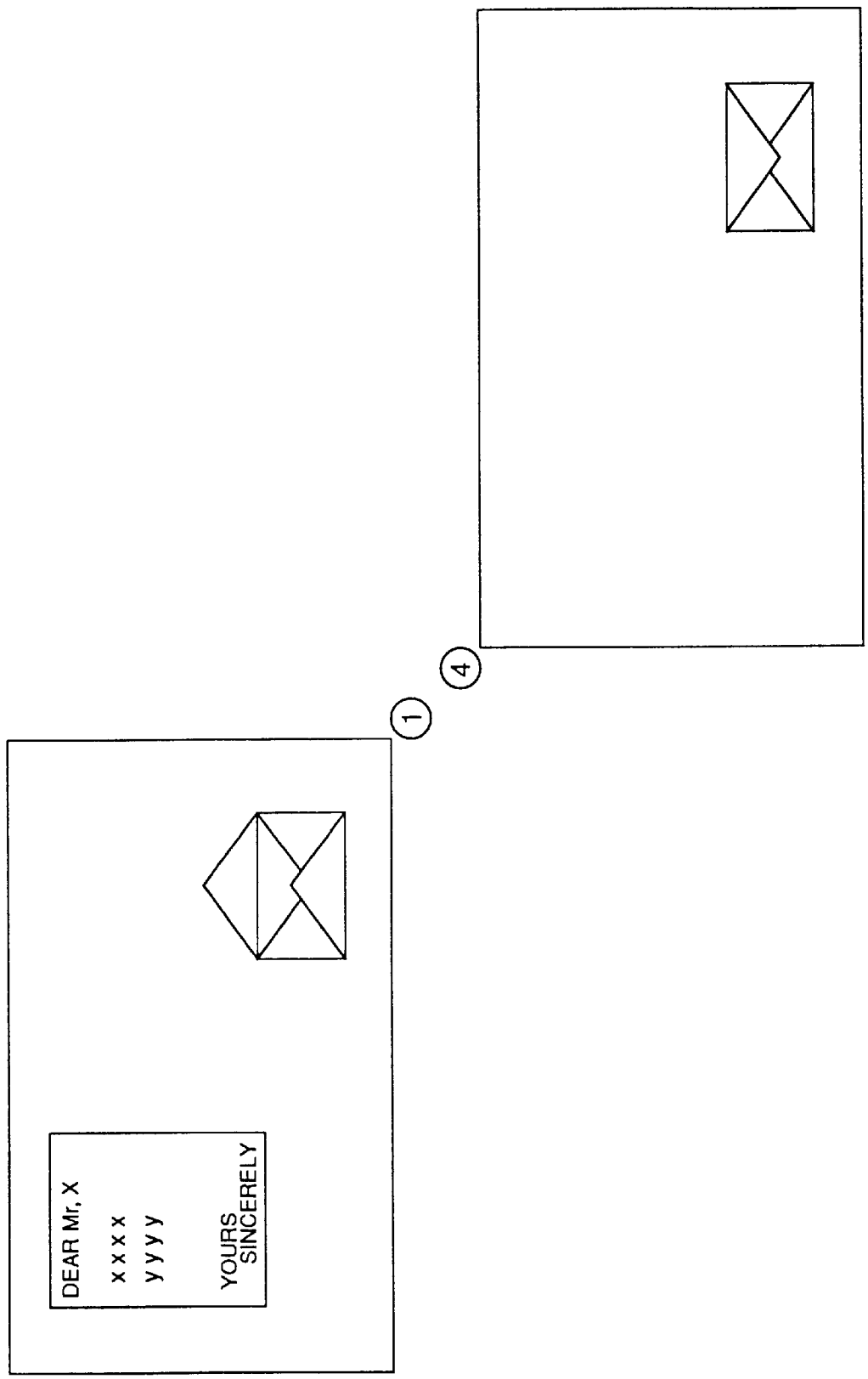
FIG. 3 shows an example of simplified presentation of the operation support information shown in FIG. 2.

For example, the CPU 3 decides thinning the presentation information when the user has used the electronic apparatus, e.g., for not less than 1 month (F≧1 month) with not less than 100 presentations (E≧100 times) and is now inputting a command during the presentation (H>0 time). FIG. 3 shows an example of presentation of the thinned information on a display screen. This presentation consists of two images ① and ④, omitting two middle frames from the four images ① to ④ of the initial presentation shown in FIG. 2. The CPU 3 decides further thinning the presentation to one image ④ only if the user has used the device for more than two months (F≧2 months). Only an audio signal may be emitted instead of the above visual presentation if the user has used the device for more than four months (F ≧4 months).

The operation of the presentation device in presenting the operation support information will be described below with reference to FIGS. 4 to 10.

FIG. 4 is illustrative of a conceptual presentation data 41 stored in the memory 4 and exemplified images of the presentation data 41. The presentation data 41 consists of a presentation table 411 showing an order of presenting data and a presentation time and presentation images 412, 413, 414, 415 and others not shown in FIG. 4.

Figure 8:
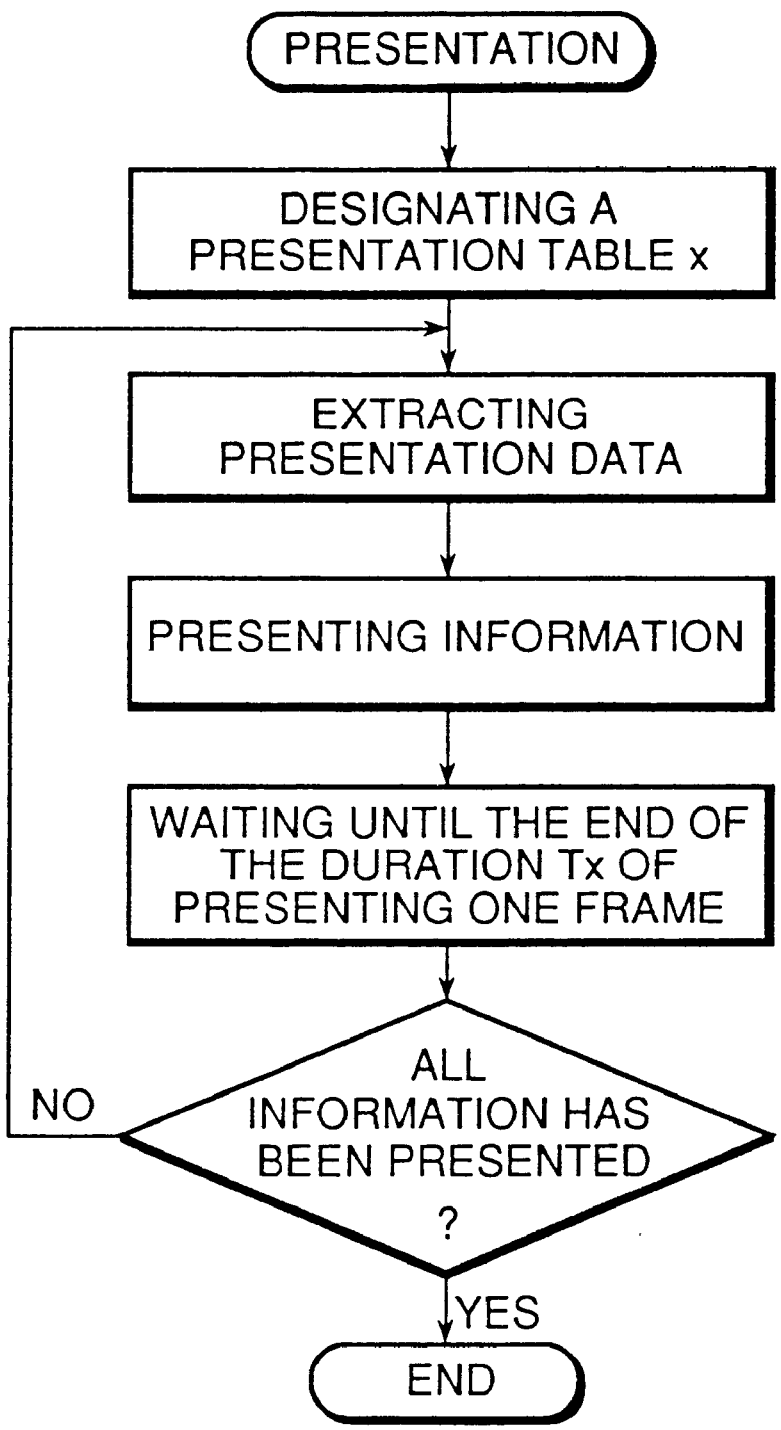
FIG. 8 is a flow chart depicting a procedure of presenting operation support information.

The presentation operation is carried out according to a flowchart shown in FIG. 8. In the initial period of use, the upper line of the presentation table x is designated as shown in FIG. 4 and presentation image data (412 to 415) according to the table of FIG. 4 is subsequently output at an interval of preset time Tx to present animated images on the display screen as shown FIG. 2.

Figure 5:
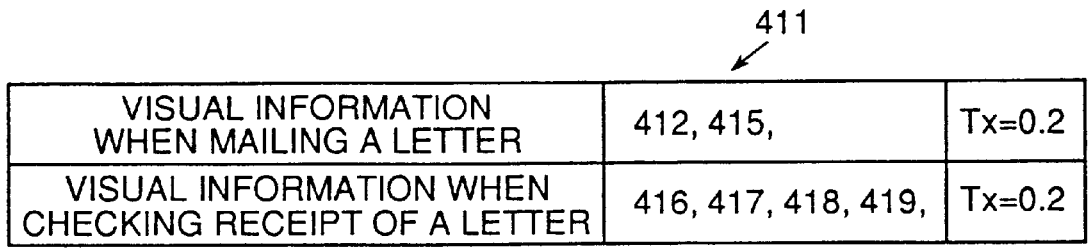
FIG. 5 shows an exemplified presentation data table which is prepared by thinning the data in the table of FIG. 4.
Figure 9:
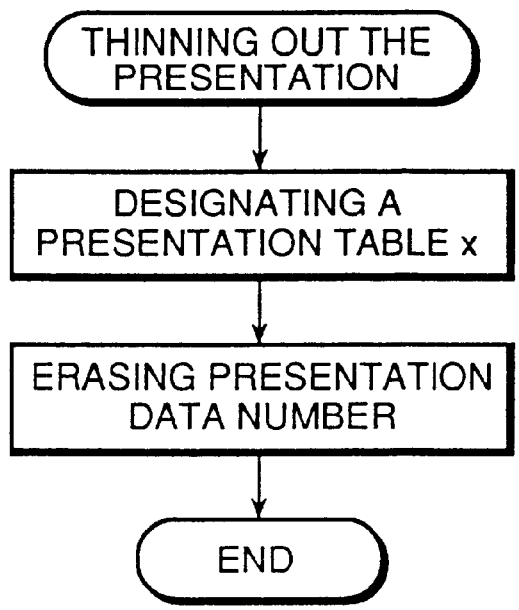
FIG. 9 is a flow chart depicting a procedure of erasing data for thinning the presentation of operation support information.
Figure 10:
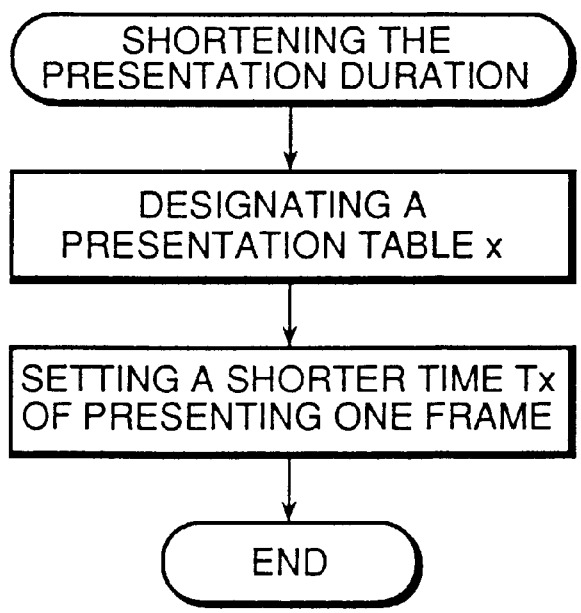
FIG. 10 is a flow chart depicting a procedure of setting data for shortening the time of presenting operation support information.

When an instruction for thinning the presentation was given according to a decision made by the discriminating means 32, the erasing means 34 executes the flowchart operation of FIG. 9 to omit the presentation data 413 and 414 from the content of FIG. 4 for sending a mail in the initial period. In this case, the content of the presentation table is partly omitted as shown in FIG. 5 and image data is subsequently output according to the flowchart of FIG. 8 to display animated images as shown in FIG. 3.

Figure 6:
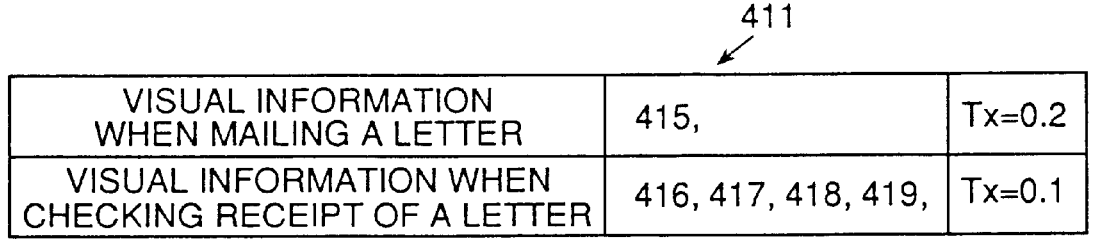
FIG. 6 shows an exemplified presentation-data table which is prepared by further thinning the data in the table of FIG. 5.
Figure 7:
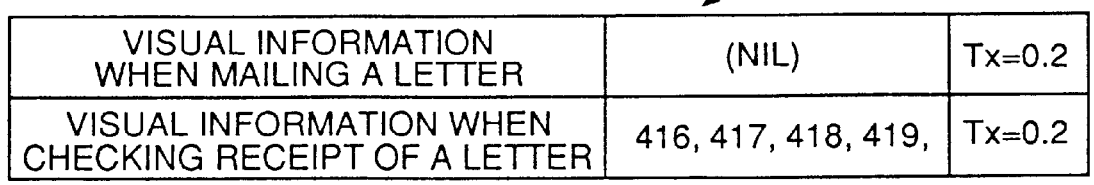
FIG. 7 shows a presentation data table when the operation support information is deleted.

The second stage of simplifying the presentation is realized by rewriting the presentation table as shown in FIG. 6, whereby only an image 415 is displayed. The further stage of simplifying the presentation is realized by rewriting the presentation table as shown in FIG. 7, whereby no visual information is displayed.

Thus, presentation of the stored image data can be changed whether a pointer (or pointers), i.e., a presentation image number (or numbers) of presentation data is rewritten in the presentation table as shown in FIGS. 4 to 7 respectively. This can shorten the presentation time by omitting an image or images that became unnecessary to present for the skilled user.

The duration to the end of the presentation can be also shortened by reducing a time of presenting each of the images. In the table 411 (FIGS. 4 to 7), Tx designates the presentation time. The operation to change the preset time Tx is conducted according to the flowchart shown in FIG. 10.

In the shown embodiment, Tx is set at 0.2 in FIG. 4 and Tx is set at 0.1 in FIG. 6 when checking a received mail. In the later case (FIG. 6), a presentation time per frame is shortened for checking a mail and a total presentation time is shorter than that in the case of FIG. 4. However, shortening the presentation time for each frame is limited to the upper limit of processing time defined by the hardware and software.

As described above, the presentation of operation support information is simplified by thinning or omitting frames on the basis of the judgment on the user's skill. Once the presentation was thinned or omitted, the presentation data and the presentation program become not further displayed and unused partly or all. Data that was necessary for this presentation becomes unnecessary to be stored in the memory.

The data and program may be either erased (1) or stored in compressed state (2) to increase the unused capacity of the memory 4.

FIG. 11 shows states of utilizing the memory 4 of the device provided with erasing means and compressing means. The operations of the erasing and the compressing means are as follows:

In FIGS. 11A to 11C, the memory 4 is shown in FIG. 11A of an initial period, in which presentation image data ②, ③ and ① . . . are stored. When the presentation is thinned by erasing, e.g., image data ② and ③, the state of the memory is changed to a state of FIG. 11B in which the usable (unused) memory capacity is correspondingly increased.

In practice, a pointer indicating the last address of a usable memory area for a telephone number table is moved so as to include the erased portion into the usable area of the table. The usable memory area for the telephone number table can be thus widened. This is achieved by using the erasing means 34 included in the CPU 3.

The initial arrangement of indicated data of the visual presentation data ②, ③ and ① in the memory 4 (as shown in FIG. 11A) is devised for easily releasing the memory area when the data became partly unnecessary or unused. If the data is arranged in the order of ①, ②, ③ or ②, ①, ③, the erased portion cannot directly be used or only the area of image data ② can be used. In the other words, additional processing is needed to move the presentation image data ① in the memory and rewrite a pointer indicating the image data ① in the presentation table.

The data compression can be conducted according to any known compressing method, e.g., the MH or MR method for compressing visual information for facsimile communication or PSI-CELP method for compressing audio information or LZW method for compressing character information. The compression means 35 works under the control of the CPU 3.

The compressed data is arranged as shown in FIG. 11C, making it possible to release the memory 4. The compressed data can be restored (expanded) as shown in FIG. 11A. However, it cannot be achieved if the telephone number table has occupied the memory area of the image data ② and ③. In this case, the CPU 3 inquires of the user whether he or she selects erasing the telephone numbers in the occupied area. The expansion of the compressed data is achieved by using the restoring means 36 of the CPU 3.

The user's convenience can be thus enhanced by increasing, by using erasing or compressing means, the memory area usable for further registering telephone numbers. In this case, the arrangement of the presentation data area next to the telephone number storing area eliminates the need of moving the data in the memory, assuring the effective use of the memory capacity.

The function of nullifying means 37 of the CPU 3 is set according to a command input through the keyboard so as to nullify the discriminating means 32.

The nullifying means 37 initiates all the above-mentioned values (A) to (J) to cause the discriminating means to judge the user needing the operation support information. In this case, the data stored in the compressed state can be restored by the restoring means if there is an unused (working) area for temporary storing restored data in the memory 4.

It is also possible to store the images in the initially compressed state in a reduced memory area. In this case, the images to be presented must be restored in advance through the calculation by the CPU with use of a temporary working memory (for companding operation).

Although the embodiment described above presents animated operation-support information, it can also provide, in a similar way, presentation of audio (music) information and/or text (character image) information. For audio information, the presentation table 411 consists of pointers indicating parameters such as musical interval and sound length, according to which the data read out from the memory to generate musical sound information. The tempo of sound information is quickened by reducing length of each sound, thus quickly ending the music. The presentation time can also be shortened by reducing the length of the music itself.

Sound frequencies to be generated and lengths of sound are used as parameters of the sound output. The speed of the music is defined by a parameter indicating a tempo. An example is as follows: 120 quarter notes sound for a minute if a tempo per quarter note is set at 120. Namely, a quarter note has a sound length of 0.5 seconds. With setting of 60 quarter notes per minute, each quarter note sounds 1.0 second.

When sound information of (Do, ♪), (Re, ♪), (Mi, ♪), (Rest, ♪), (Do, ♪), (Re, ♪), (Mi, ♪), (Rest, ♪), (Fa, ♪), (Mi, ♪), (Re, ♪) at a tempo of 60 quarter notes per minute is wanted to sound when mailing a letter, the user can fill the presentation table with pointers for presentation data indicating paired parameters (musical interval and sound length) in such a way that a tempo/quarter note=60 is expressed by Tx=1.0 and a tempo/quarter note=120 is expressed by Tx=0.5. Thus prepared presentation table is similar in construction to the table of FIG. 4.

According to this sounding method, a series of sound frequencies (e.g., 440 Hz allocating to the sound "La") is generated with respective length values defined by respective combinations of a note and a tempo by an oscillator and subsequently output through a speaker. The Rest is a character representing silence of the fixed duration in music.

Similar to the visual presentation, the sound presentation can be shortened in its duration by either quickening a tempo of the music or shortening the music itself, e.g., omitting one of two phrases.

The text presentation differs from the visual (image) presentation only by storing data of character strings instead of image data.

The advantages of the present invention are as follows. According to some aspects of the present invention, it is possible to provide a method for presenting operation-support information for the user of an electronic apparatus, which can simplify the presentation by shortening the presentation time according to the degree of user's skill in operation of the device. This enables the skilled user to more effectively use the apparatus without waiting for unnecessary support information. The shortening the presentation time can be effectively achieved by thinning a sequence of presentation data or animated images or by reducing the presentation time of each of frames to be displayed.

According to another aspect of the present invention, it is possible to easily provide an existing apparatus with new functions by applying a recording medium. The electronic apparatus with the newly functioning recording medium can attain the above mentioned effects.

According to another aspect of the present invention, it is possible to provide an electronic apparatus which can recognize a degree of necessity of presenting operation support information according to the degree of the user's skill in input operation with the apparatus on the basis of the collected data, and which can automatically simplify the presentation by shortening the presentation time according to the recognized degree of user's acquaintance with the device. This enables the skilled user to more effectively use the apparatus without waiting for unnecessary support information.

According to another aspect of the present invention, it is possible to provide practical data for effectively discriminating the necessity of presenting the operation support information for the user of the electronic apparatus. This enables the user to more effectively use the apparatus.

According to another aspect of the present invention, it is possible to provide an electronic apparatus which can recognize a degree of necessity of presenting the operation support information according to the operation made by the user during the presentation and can shorten the presentation time, allowing the user to effectively do inputting operation without waiting for unnecessary information.

According to another aspect of the present invention, it is possible to provide an electronic apparatus which can more correctly judge the necessity of presenting the operation support information according to the amount of data used by the user and the memory capacity used by the user and can further shorten the presentation time, thus allowing the user to effectively do inputting operation with no waiting time.

According to another aspect of the present invention, it is possible to provide an electronic apparatus which can create memory area usable by the user by erasing unnecessary presentation data by using the data erasing means.

According to another aspect of the present invention, it is possible to provide an electronic apparatus which can create memory area usable by the user by compressing unnecessary presentation data by using the data compressing means.

According to another aspect of the present invention, it is possible to provide an electronic apparatus which can not only erase the unnecessary presentation data but also restore the capability of presenting the operation support information for the user if the needs be.

According to another aspect of the present invention, it is possible to prevent an electronic apparatus from automatically operating.

According to another aspect of the present invention, it is possible to provide an electronic apparatus which can gradually simplify the presentation of operation support information in such a way that the user may not incompatibly feel a change in the presentation or may not misunderstand it as an error.

According to another aspect of the present invention, it is possible to provide an electronic apparatus which can simplify the presentation of operation support information by shortening the presentation time, enabling the user to do inputting operation in a suitable working state with no unnecessary waiting time. This is achieved by using practically effective means for thinning a presentation data sequence or an animated image sequence or shortening the duration of each frame to be displayed.

According to another aspect of the present invention, it is possible to provide an electronic apparatus which can easily release the memory and use it without rearrangement data in the memory.

What is claimed is:

1. In an electronic apparatus having an information presenting means, an information presenting method for presenting information by the information presentation means, the method comprising:

estimating a degree of necessity of presenting the information according to operation records and/or state information of the electronic apparatus;

based upon said estimating, determining whether to present the information in a detailed form or in a simplified form, wherein said determining is based at least in part upon a used capacity of memory of the apparatus; and simplifying presentation information when it is determined in said determining step to present the information in a simplified form.

2. An information presentation method as defined in claim 1, wherein the presentation information is simplified by deleting at least a part of the information or by presenting another type of information having a smaller amount of data.

3. An information presentation method as defined in claim 1, wherein the information is presented as a sequence of animated images and simplified by reducing the number of images and/or shortening a presentation time for each of the images.

4. An information presentation method as defined in claim 1, wherein the information is presented as audio information and simplified by deleting at least a part of the audio information and/or by shortening an audio presentation time.

5. An information recording medium for recording information including program software and data for implementing the method defined in claim 1.

6. An information presentation device for presenting an operating process and/or an inputting procedure of an electronic apparatus provided with an inputting operation device and a presentation means, the device comprising:

data collecting means for collecting operation records of the electronic apparatus or working information including a current working state of the device;

discriminating means for determining the degree of necessity of presentation from the data collected by the data collecting means and deciding whether to change the presentation information according to a determined degree of necessity of the presentation; and means for simplifying the presentation according to a decision made by the discriminating means; and data erasing means for erasing data stored in a memory of the electronic apparatus and, when the discriminating means determines there is no need to present the information, causes the data erasing means to delete the unnecessary presentation data.

7. An information presentation device as defined in claim 6, wherein data collectable by the data collecting means is data representing operation records of the electronic apparatus, which data includes at least one of the following parameters: the number of the apparatus operation starts, the number of the apparatus operation ends, the number of the presentation program starts, the number of the presentation program ends, the number of data presentations, an integrated operation time of the apparatus and a change in user's input operation speed.

8. An information presentation device as defined in claim 6, wherein the data collectable by the data collecting means is the number of input operations made by a user during presentation of the specified information.

9. An information presentation device as defined in claim 6, wherein data collectable by the data collecting means is data representing used capacity and/or unused capacity of a memory of the electronic apparatus.

10. An information presenting device as defined in any one of claims 6 to 9, wherein the device is further provided with a data compressing means for compressing data stored in a memory of the electronic apparatus and, when the discriminating means decides it is unnecessary to present the information, causes the data compressing means to compress the unnecessary presentation data and/or the unnecessary program in the memory.

11. An information presentation device as defined in claim 10, wherein the device is further provided with a data restoring means for restoring compressed data in the memory of the electronic apparatus and a data changing means for changing an estimate value of data obtained by the data collecting means and causes the data restoring means to restore the compressed data and/or the program to an expanded state and stored in the memory and the data changing means to change the values of the estimate data obtained by the data collecting means.

12. An information presentation device as defined in claim 6, wherein the device is further provided with a nullifying means for nullifying the decision made by the discriminating means to prevent the presentation information from being simplified.

13. An information presentation device as defined in claim 6, wherein the presentation information is changed according to the decision made by the discriminating means in such a way that the presentation information is simplified in a plurality of stages corresponding to necessary degrees of the presentation.

14. An information presentation device as defined in claim 13, wherein simplification of the presentation information in a plurality of stages is conducted by thinning out the presentation data stored in a memory and/or shortening a presentation time.

15. An information presentation device as defined in claim 6, wherein a data is arranged in the memory of the electronic apparatus in such a way that erasable or compressible data of the presentation data and/or the presentation program is disposed next to an area of data to be updated any time at need.

16. An electronic apparatus comprising:
- a radio communication device for transmitting and/or receiving radio communications;
- a display for presenting information to a user;
- a memory for storing the information to be presented to the user via said display, and/or other information;
- a discriminating device for determining a skill level of a user, and when it is determined that the skill level of the user has increased beyond a threshold then erasing certain information from said memory thereby increasing available memory for the user.

17. The electronic apparatus of claim 16, wherein the discriminating device in carrying out said determining of the skill level of the user takes into consideration at least one of: a) used capacity of the memory, b) speed of input operations input by the user, c) a number of operation starts of the electronic apparatus, d) a number of operation ends of the electronic apparatus, e) a number of starts and/or ends of a program stored in the electronic apparatus, f) change in the user's input speed, and g) unused capacity of the memory.

18. The electronic apparatus of claim 16, wherein the information to be erased from the memory comprises at least one of display information, audio information, and program information.

* * * * *